Nov. 3, 1925.  
E. C. HUTCHINSON  
BEARING CONSTRUCTION  
Filed Sept. 5, 1924  
1,559,879
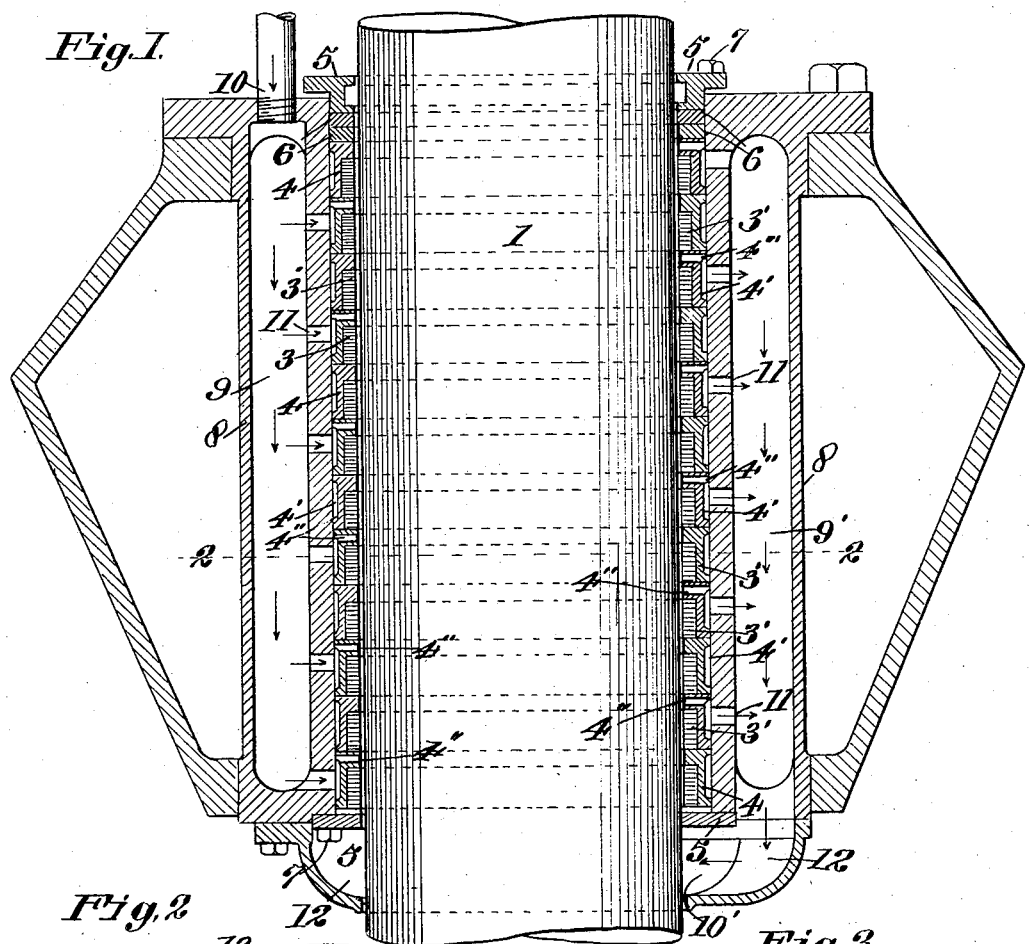
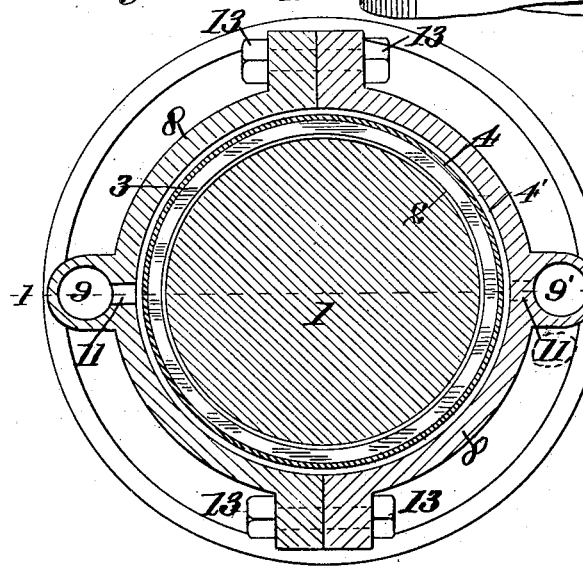
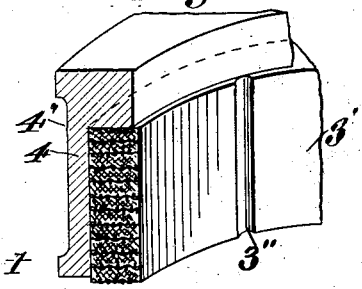
Inventor.
E. C. Hutchinson
By Harry A. Cotton
Attorney.

Patented Nov. 3, 1925.

1,559,879

UNITED STATES PATENT OFFICE.

ELY C. HUTCHINSON, OF SAN FRANCISCO, CALIFORNIA, ASSIGNOR TO THE PELTON WATER WHEEL CO., OF SAN FRANCISCO, CALIFORNIA, A CORPORATION OF CALIFORNIA.

BEARING CONSTRUCTION.

Application filed September 5, 1924. Serial No. 735,982.

*To all whom it may concern:*

Be it known that I, ELY C. HUTCHINSON, a citizen of the United States, residing at city and county of San Francisco, and State of California, have invented certain new and useful Improvements in Bearing Construction, of which the following is a specification.

The present invention relates to bearing construction and particularly to bearings supporting shafts in either horizontal or vertical positions. Heretofore, bearings of this nature have been made of lignum vitæ, with or without means for adjustment to take up wear. To make this type of bearings adjustable involves heavy expense and a complication of parts which it is very desirable to remove.

The object of the present invention is to produce an inexpensive adjustable bearing which contains wearing elements that are easily removed and replaced and upon which the adjustment may be accomplished without retarding or stopping the rotation of the shaft and without fear of tightening the bearing to such an extent as would cause disaster through overheating.

Another object is to provide a means whereby said bearing may be lubricated at all times when the shaft is in operation.

With the above mentioned and other objects in view, the invention consists in the novel construction and combination of parts hereinafter described and illustrated in the accompanying drawings and pointed out in the claims hereto appended, it being understood that various changes in form, proportion, size and minor details of construction may be resorted to without departing from the spirit or sacrificing any of the advantages of the invention.

To more fully comprehend the invention, reference is directed to the accompanying drawings, wherein—

Fig. 1 is a longitudinal section of a preferred embodiment of the invention taken on line 1—1 of Fig. 2.

Fig. 2 is a cross section of same taken on the line 2—2 of Fig. 1.

Fig. 3 is a fragmentary perspective view of one of the bearing rings.

In the drawings wherein like characters of reference designate corresponding parts, 1 indicates a shaft, provided on its outer surface with a bronze sleeve 2. Said shaft is mounted within and bears upon a series of rings 3 circumferentially embracing it. These rings are spaced from one another and each is composed of an elastic substance such for example as rubber, having embedded therein cloth strips 3'. The rings may be moulded solid or scarfed on the ends. The spacing of the rings is effected by means of a series of sliding metal rings or containers 4 of angle section fitting between the packing and the bearing rings 3. These containers due to their slidability provide a means whereby the bearing rings 3 may be adjusted, by exerting a compressive force parallel with the shaft axis. 5 are gland members at the top and bottom of the bearing which serve as retaining heads for the bearing rings 3 and the slidable metal containers 4, holding the same in position. Said glands and the packing 6 thus form compressing means for the bearing rings, and are held in position by means of the nuts 7. The metal containers are circumferentially grooved on their backs as shown at 4'. The packing rings 3 and the metal containers 4, which comprise the bearing, are fitted within a bearing seat 8 preferably made in section as shown in Fig. 2 and clamped together by bolts 13. The bearing seat 8 is provided with opposite longitudinal chambers, one of which 9 is connected at its top as at 10 with a source of water, or other lubricant not shown, under pressure, and the other 9' communicates at its bottom with a discharge 10'. These chambers are to provide a lubricating means for the bearing, the lubricant passing from the supply chamber 9 through the ports 11 in the wall of the seat 8 into the back grooves 4' of the metal chambers 4 and thence through ports 4'' in the spacing portion of said containers to the face of the bearing rings 3, in which rings water passage grooves 3'' are made as shown in Fig. 3. The water so admitted is discharged at the opposite side of the bearing through the corresponding ports and grooves, indicated by like numerals, into the charge chamber 9'. The ports 11 and 4'' on opposite sides are, as shown in Fig. 1, relatively staggered so that alternate members on each side may carry them and thus have the lubricant reach all parts of the bearing. The lubricant is discharged from the bearing and from the discharge chamber into a collector 12.

I claim:

1. A shaft bearing comprising a plurality of compressible bearing rings embracing the shaft; a series of slidable non-compressible rings separating and surrounding a portion of the width of said bearing rings; means applied to the end of the series of slidable rings for exerting pressure thereon to adjust the compressible bearing rings to the shaft and means for supplying a lubricant under pressure to the face of the bearing rings consisting of a supply chamber in one side of said bearing connected with a source of lubricant, a discharge chamber on the opposite side of said bearing for discharging the lubricant and suitable channels from said chambers communicating with the face of the bearing rings.

2. A shaft bearing comprising a plurality of compressible bearing rings embracing the shaft; a series of slidable non-compressible rings separating and surrounding a portion of the width of said bearing rings; means applied to the end of the series of slidable rings for exerting pressure thereon to adjust the compressible bearing rings to the shaft; and means for supplying a lubricant through the said slidable rings to the face of the bearing rings consisting of a supply chamber in one side of said bearing connected with a source of lubricant, a discharge chamber on the opposite side of said bearing for discharging the lubricant and suitable channels from said chambers communicating with the face of the bearing rings, said channels being relatively staggered with relation to the opposing chambers.

3. A shaft bearing comprising a plurality of compressible bearing rings embracing the shaft; a series of slidable non-compressible rings separating said bearing rings; a fixed bearing seat embracing and guiding said slidable rings; means applied to the end of the series of said slidable rings for exerting pressure thereon to adjust the compressible bearing rings to the shaft; and means for supplying a lubricant under pressure to the face of the bearing rings consisting of a supply chamber in one side of said bearing seat connected with a source of lubricant, a discharge chamber on the opposite side of said bearing seat for discharging the lubricant and suitable channels from said chambers communicating with the face of the bearing rings.

4. A shaft bearing comprising a plurality of compressible bearing rings embracing the shaft; a series of slidable non-compressible rings separating said bearing rings; a fixed bearing seat embracing and guiding said slidable rings; and means applied to the end of the series of said slidable rings for exerting pressure thereon to adjust the compressible bearing rings to the shaft; and means for supplying a lubricant under pressure to the face of the bearing rings consisting of a supply chamber in one side of said bearing seat connected with a source of lubricant, a discharge chamber on the opposite side of said bearing seat for discharging the lubricant and suitable channels from said chambers communicating with the face of the bearing rings, said channels being relatively staggered with relation to the opposing chambers.

5. A shaft bearing comprising a plurality of compressible bearing rings embracing the shaft, a series of slidable non-compressible bearing rings separating said compressing bearing rings with the opposing edges of the respective compressible bearing rings contacting with successive non-compressible bearing rings, means applied to the ends of the series of said slidable rings for exerting pressure thereon to adjust the compressing bearing rings to the shaft, said non-compressible bearing rings being circumferentially grooved on their back wall and formed with a channel connecting the groove with the face of the compressible rings, a fixed bearing seat embracing and guiding the bearing rings, and means for supplying a lubricant to said compressible rings consisting of a supply chamber in one side of said bearing seat connected with a source of lubricant, a discharge chamber on the opposite side of said bearing seat for discharging the lubricant, said chambers communicating with the grooves of alternate non-compressible rings.

6. A shaft bearing comprising a plurality of compressible bearing rings embracing the shaft, said rings on their inner face being grooved from top to bottom, a series of slidable non-compressible rings separating and surrounding a portion of the width of said bearing rings, means applied to the end of the series of slidable rings for exerting pressure thereon to adjust the compressible bearing rings to the shaft, and means for supplying a lubricant through the said slidable rings to the grooved face of the bearing rings consisting of a supply chamber in one side of said bearing connected with a source of lubricant, a discharge chamber on the opposite side of said bearing for discharging the lubricant and suitable channels from said chambers comunicating with the face of the bearing rings, said channels being relatively staggered with relation to the opposing chambers.

In testimony whereof I have signed my name to this specification.

ELY C. HUTCHINSON.